United States Patent
Crandall et al.

(10) Patent No.: US 11,669,912 B1
(45) Date of Patent: Jun. 6, 2023

(54) CASH LOSS EXCEPTION AND RECONCILIATION SYSTEM AND METHOD

(71) Applicant: G4S Retail Solutions (USA) Inc., Jupiter, FL (US)

(72) Inventors: Shellie Crandall, Jupiter, FL (US); Brian McCabe, Jupiter, FL (US)

(73) Assignee: G4S Retail Solutions (USA) Inc., Jupiter, FL (US)

( * ) Notice: Subject to any disclaimer, the term of this patent is extended or adjusted under 35 U.S.C. 154(b) by 206 days.

(21) Appl. No.: 16/928,460

(22) Filed: Jul. 14, 2020

Related U.S. Application Data

(60) Provisional application No. 62/874,215, filed on Jul. 15, 2019.

(51) Int. Cl.
- *G06Q 40/00* (2023.01)
- *G06F 3/0481* (2022.01)
- *G06Q 40/12* (2023.01)

(52) U.S. Cl.
CPC .......... *G06Q 40/12* (2013.12); *G06F 3/0481* (2013.01)

(58) Field of Classification Search
CPC ............................. G06Q 40/12; G06F 3/0481
See application file for complete search history.

(56) References Cited

U.S. PATENT DOCUMENTS

| | | | |
|---|---|---|---|
| 5,553,320 A | 9/1996 | Matsuura et al. | |
| 7,610,215 B1 | 10/2009 | Folk et al. | |
| 7,635,085 B2 | 12/2009 | Brown et al. | |
| 7,900,829 B1 | 3/2011 | Folk et al. | |
| 7,940,176 B2 | 5/2011 | Bohen et al. | |
| 7,950,512 B2 | 5/2011 | Folk et al. | |
| 7,954,699 B1 | 6/2011 | Sanders et al. | |
| 8,011,581 B1 | 9/2011 | Folk et al. | |
| 8,019,663 B1 | 9/2011 | Bohen et al. | |
| 8,025,214 B1 | 9/2011 | Folk et al. | |
| 8,032,415 B2 | 10/2011 | Sanders et al. | |
| 8,047,427 B2 | 11/2011 | Sanders et al. | |
| 8,056,305 B1 | 11/2011 | Folk et al. | |
| 8,096,398 B2 | 1/2012 | Folk et al. | |
| 8,117,127 B1 | 2/2012 | Sanders et al. | |
| 8,141,772 B1 | 3/2012 | Folk et al. | |
| 8,157,078 B1 | 4/2012 | Folk et al. | |
| 8,172,067 B1 | 5/2012 | Folk et al. | |
| 8,175,970 B1 | 5/2012 | Mon et al. | |

(Continued)

OTHER PUBLICATIONS

United States Patent and Trademark Office, NonFinal Office Action for U.S. Appl. No. 16/516,000, dated Aug. 13, 2020, (17 pages), U.S.

(Continued)

*Primary Examiner* — Paul Danneman
(74) *Attorney, Agent, or Firm* — Alston & Bird LLP

(57) ABSTRACT

To maintain an updated and immutable record of reconciliation data provided to reconcile an exception relating to one or more cash-based transactions. Exceptions are automatically identified based at least in part on data received from one or more data sources, and corresponding exception case data objects are generated as immutable exception case data objects. Update data is provided for the immutable exception case data objects, causing updates to a corresponding graphical user interface while maintaining an immutable historical record of updates provided for the exception case data objects.

20 Claims, 9 Drawing Sheets

(56) References Cited

U.S. PATENT DOCUMENTS

| | | | |
|---|---|---|---|
| 8,177,132 B1 | 5/2012 | Bohen et al. | |
| 8,181,854 B1 | 5/2012 | Folk et al. | |
| 8,181,856 B1 | 5/2012 | Folk et al. | |
| 8,196,826 B2 | 6/2012 | Folk et al. | |
| 8,201,680 B1 | 6/2012 | Folk et al. | |
| 8,210,429 B1 | 7/2012 | Bohen et al. | |
| 8,214,257 B1 | 7/2012 | Folk et al. | |
| 8,225,988 B1 | 7/2012 | Bohen et al. | |
| 8,227,936 B1 | 7/2012 | Folk et al. | |
| 8,260,669 B1 | 9/2012 | Folk et al. | |
| 8,272,563 B1 | 9/2012 | Folk et al. | |
| 8,274,364 B1 | 9/2012 | Bohen et al. | |
| 8,327,995 B1 | 12/2012 | Folk et al. | |
| 8,346,640 B1 | 1/2013 | Sanders et al. | |
| 8,387,874 B1 | 3/2013 | Bohen et al. | |
| 8,396,278 B2 | 3/2013 | Jones et al. | |
| 8,401,965 B2 | 3/2013 | Johnson et al. | |
| 8,407,119 B2 | 3/2013 | Folk et al. | |
| 8,430,303 B1 | 4/2013 | Sanders et al. | |
| 8,517,257 B1 | 8/2013 | Folk et al. | |
| 8,556,166 B1 | 10/2013 | Folk et al. | |
| 8,561,885 B1 | 10/2013 | Folk et al. | |
| 8,571,948 B1 | 10/2013 | Nichols et al. | |
| 8,600,842 B1 | 12/2013 | Sanders et al. | |
| 8,601,771 B2 | 12/2013 | Folk et al. | |
| 8,602,295 B1 | 12/2013 | Sanders et al. | |
| 8,640,945 B1 | 2/2014 | McCormick | |
| 8,781,903 B1 | 7/2014 | Bohen et al. | |
| 8,812,366 B2 | 8/2014 | Folk et al. | |
| 8,812,394 B1 | 8/2014 | Folk et al. | |
| 8,909,547 B2 | 12/2014 | Bohen et al. | |
| 8,925,797 B1 | 1/2015 | Bohen et al. | |
| 9,004,352 B1 | 4/2015 | Graef et al. | |
| 9,064,366 B1 | 6/2015 | Folk et al. | |
| 9,070,125 B1 | 6/2015 | Folk et al. | |
| 9,098,960 B1 | 8/2015 | Folk et al. | |
| 9,311,671 B2 | 4/2016 | Folk et al. | |
| 9,547,848 B2 | 1/2017 | Folk et al. | |
| 9,697,493 B2 | 7/2017 | Folk et al. | |
| 9,715,793 B1 | 7/2017 | Brancaccio | |
| 11,188,910 B2 * | 11/2021 | Yang | H04L 9/3239 |
| 11,315,379 B1 | 4/2022 | Crandall et al. | |
| 2002/0074709 A1 | 6/2002 | Kanagawa | |
| 2005/0011721 A1 | 1/2005 | Armanini et al. | |
| 2005/0027626 A1 | 2/2005 | Garcia | |
| 2005/0289030 A1 | 12/2005 | Smith | |
| 2006/0253349 A1 | 11/2006 | Brooks, Jr. et al. | |
| 2009/0070263 A1 | 3/2009 | Davis et al. | |
| 2011/0060639 A1 | 3/2011 | Garcia | |
| 2011/0258090 A1 | 10/2011 | Bosch et al. | |
| 2012/0073482 A1 | 3/2012 | Meeker et al. | |
| 2013/0191196 A1 | 7/2013 | Cecala | |
| 2013/0232064 A1 | 9/2013 | Bosch | |
| 2013/0346135 A1 | 12/2013 | Siemens et al. | |
| 2014/0279675 A1 | 9/2014 | Wiig et al. | |
| 2014/0353375 A1 | 12/2014 | Turocy et al. | |
| 2017/0061561 A1 | 3/2017 | Cha | |
| 2017/0193731 A1 | 7/2017 | Kim et al. | |
| 2017/0232300 A1 | 8/2017 | Tran et al. | |
| 2018/0005193 A1 | 1/2018 | Crandall et al. | |
| 2018/0005196 A1 | 1/2018 | Crandall et al. | |
| 2018/0047239 A1 | 2/2018 | Niizuma | |
| 2018/0078843 A1 | 3/2018 | Tran et al. | |
| 2018/0144321 A1 | 5/2018 | Baar et al. | |
| 2018/0218323 A1 | 8/2018 | Nguyen | |
| 2018/0240190 A1 | 8/2018 | Schumacher | |
| 2018/0293649 A1 | 10/2018 | Morgan et al. | |
| 2018/0300703 A1 | 10/2018 | Hiramatsu et al. | |
| 2019/0220839 A1 | 7/2019 | Oliynyk | |

OTHER PUBLICATIONS

United States Patent and Trademark Office, Unpublished U.S. Appl. No. 12/241,397.

United States Patent and Trademark Office, Office Action for U.S. Appl. No. 16/516,026, dated Jul. 9, 2020, (9 pages), U.S.

NonFinal Office Action for U.S. Appl. No. 16/906,056, dated Oct. 6, 2021, (16 pages), United States Patent and Trademark Office, USA.

Notice of Allowance and Fee(s) Due for U.S. Appl. No. 16/906,056, dated Apr. 27, 2022, (13 pages), United States Patent and Trademark Office, US.

NonFinal Office Action for U.S. Appl. No. 17/182,704, dated Jun. 17, 2022, (9 pages), United States Patent and Trademark Office, US.

NonFinal Office Action for U.S. Appl. No. 17/166,561, dated Oct. 14, 2022, (8 pages), United States Patent and Trademark Office, US.

* cited by examiner

| Case #0 | Status / Cause | Notes | Files | Case History |
|---|---|---|---|---|

Customer: Acme

Location Name: Acme Location name

Location #: 4231

CIT Vendor: CIT vendor name

Case Vault Processor: A Cash Vault Processor

Transport Fine Count Carrier: Transport Fine Count Carrier Location

Exception Date: DATE 3 12:10 AM

Amount: $3,241.32

Bank: Name of Bank

Machine ID: BA-194032

Safe ID: 1251249396

Bag Number: 1234

Net Cash Sales

| Machines | | Match D Records | | Transmitted Data | | | | | | | | | |
|---|---|---|---|---|---|---|---|---|---|---|---|---|---|

Start Date: 7/18/2019  End Date: 7/20/2019  🔍 Search

| CREDIT DATE | REV DATE | FST AMT | SEC AMT | CHK AMT | AMT OVER | AMT UNDER | 100S | 50S | 20S | 10S | 5S | 2S | 1S | MIXED COIN | BAG NUMBER |
|---|---|---|---|---|---|---|---|---|---|---|---|---|---|---|---|
| DATE 1 | DATE 2 | $231.00 | $321.00 | $1,324.00 | $323.00 | $0.00 | $100.00 | $50.00 | $20.00 | $10.00 | $5.00 | $2.00 | $1.00 | $30.00 | 123434 |
| DATE 1 | DATE 2 | $231.00 | $321.00 | $1,324.00 | $323.00 | $0.00 | $100.00 | $50.00 | $20.00 | $10.00 | $5.00 | $2.00 | $1.00 | $30.00 | 123434 |

| Case #0 | Status / Cause | Notes | Files | Case History |
|---|---|---|---|---|
| Approval.mp4 | | Download | | |
| excel.xlsx | | Download | | |

Upload a file
Click here to select a file from your computer

FIG. 11

| Case #0 | Status / Cause | Notes | Files | Case History |
|---|---|---|---|---|
| Date: | DATE 3:45 PM | Action: | | Case Created |
| Date: | DATE 4:45 PM | Action: | | Case Assigned to JR |
| Date: | DATE 4:45 AM | Action: | | Case Assigned to Carrier X |
| Date: | DATE 4:45 PM | Action: | | Case Assigned to Bank Y |

CASH LOSS EXCEPTION AND RECONCILIATION SYSTEM AND METHOD

CROSS-REFERENCE TO RELATED APPLICATIONS

This patent application claims priority to U.S. Provisional Patent Appl. Ser. No. 62/874,215, filed Jul. 15, 2020 which is incorporated herein by reference in its entirety.

BACKGROUND

Identifying and reconciling various cash-based transactions having missing, inaccurate, and/or incomplete information has historical required a significant time-investment for human investigators based on incomplete information regarding the transactions. The human investigators are thus required to determine what information is missing, where the missing information may be obtained, and to identify how to reconcile the transactions.

Accordingly, a need exists for systems and methods for automatically reconciling various cash-based transactions.

BRIEF SUMMARY

Certain embodiments are directed to an automated cash transaction reconciliation system for generating an immutable record of a transaction reconciliation, the system comprising: one or more memory storage areas and one or more processors collectively configured to: receive transaction data corresponding with a plurality of cash-based transactions, wherein the transaction data is generated via a cash handling device to reflect physical cash movement associated with the cash handling device; generate, for one or more of the plurality of cash-based transactions, an immutable exception case data object for storage within the one or more memory storage areas; automatically determine, for each exception case data object, a plurality of associated data sources; receive update data from at least one of the plurality of associated data sources for a corresponding exception case data object of the plurality of exception case data objects; store the update data as an immutable update to the corresponding exception case data object together with a timestamp associated with the update data; and generate a graphical user interface relating to the corresponding exception case data object comprising a plurality of updatable fields, wherein data displayed within each of the plurality of updatable fields comprises data associated with a corresponding updatable field and having a most-recent timestamp; automatically update data stored in association with at least one updatable field to modify the data displayed within at least one of the plurality of updatable fields; and upon receipt of user input, display a historical data record relating to the corresponding exception case data object, wherein the historical data record comprises historical data previously included within at least one of the plurality of updatable fields.

In certain embodiments, the one or more processors are further configured to: identify received update data as reconciling the corresponding exception case data object; transmit an approval request data object to at least one of the plurality of associated data sources; and upon receipt of approval data in response to the approval request data object, close the corresponding exception case data object. In various embodiments, the one or more processors are further configured to automatically assign a user identifier to an exception case data object, wherein the assigned user identifier is identified as one of the plurality of associated data sources. In certain embodiments, generating a graphical user interface comprises generating a graphical user interface accessible via a user computing entity associated with the assigned user identifier. Moreover, the one or more processors may be further configured to generate a summary graphical user interface reflecting a plurality of exception case data objects associated with the user identifier. In certain embodiments, each of the exception case data objects are configured for storing one or more data files in association with each of the exception case data objects.

In certain embodiments, the one or more processors are further configured to automatically identify a link between at least two of the plurality of exception case data objects to at least partially reconcile the at least two of the plurality of exception case data objects, and wherein data indicative of the link is stored within each of the at least two of the plurality of exception case data objects.

Various embodiments are directed to a computer-implemented method for automated cash transaction reconciliation for generating an immutable record of a transaction reconciliation, the method comprising: receiving, via one or more processors, transaction data corresponding with a plurality of cash-based transactions, wherein the transaction data is generated via a cash handling device to reflect physical cash movement associated with the cash handling device; generating, via the one or more processors and for one or more of the plurality of cash-based transactions, an immutable exception case data object for storage within the one or more memory storage areas; automatically determining, via the one or more processors and for each exception case data object, a plurality of associated data sources; receiving, via the one or more processors, update data from at least one of the plurality of associated data sources for a corresponding exception case data object of the plurality of exception case data objects; storing, within one or more memory storage areas, the update data as an immutable update to the corresponding exception case data object together with a timestamp associated with the update data; and generating, via the one or more processors, a graphical user interface relating to the corresponding exception case data object comprising a plurality of updatable fields, wherein data displayed within each of the plurality of updatable fields comprises data associated with a corresponding updatable field and having a most-recent timestamp; automatically updating, via the one or more processors, data stored in association with at least one updatable field to modify the data displayed within at least one of the plurality of updatable fields; and upon receipt of user input, displaying, via the one or more processors, a historical data record relating to the corresponding exception case data object, wherein the historical data record comprises historical data previously included within at least one of the plurality of updatable fields.

In certain embodiments, the method further comprises identifying received update data as reconciling the corresponding exception case data object; transmitting an approval request data object to at least one of the plurality of associated data sources; and upon receipt of approval data in response to the approval request data object, closing the corresponding exception case data object.

In various embodiments, the method further comprises automatically assigning a user identifier to an exception case data object, wherein the assigned user identifier is identified as one of the plurality of associated data sources. In various embodiments, generating a graphical user interface comprises generating a graphical user interface accessible via a user computing entity associated with the assigned user identifier. In certain embodiments, the method further comprises generating a summary graphical user interface reflecting a plurality of exception case data objects associated with the user identifier. In certain embodiments, each of the exception case data objects are configured for storing one or more data files in association with each of the exception case data objects. In various embodiments, the method further comprises automatically identifying a link between at least two of the plurality of exception case data objects to at least partially reconcile the at least two of the plurality of exception case data objects, and wherein data indicative of the link is stored within each of the at least two of the plurality of exception case data objects.

Certain embodiments are directed to a computer program product comprising a non-transitory computer readable medium having computer program instructions stored therein, the computer program instructions when executed by a processor, cause the processor to: receive transaction data corresponding with a plurality of cash-based transactions, wherein the transaction data is generated via a cash handling device to reflect physical cash movement associated with the cash handling device; generate, for one or more of the plurality of cash-based transactions, an immutable exception case data object for storage within the one or more memory storage areas; automatically determine, for each exception case data object, a plurality of associated data sources; receive update data from at least one of the plurality of associated data sources for a corresponding exception case data object of the plurality of exception case data objects; store, within one or more memory storage areas, the update data as an immutable update to the corresponding exception case data object together with a timestamp associated with the update data; and generate, a graphical user interface relating to the corresponding exception case data object comprising a plurality of updatable fields, wherein data displayed within each of the plurality of updatable fields comprises data associated with a corresponding updatable field and having a most-recent timestamp; automatically update data stored in association with at least one updatable field to modify the data displayed within at least one of the plurality of updatable fields; and upon receipt of user input, display a historical data record relating to the corresponding exception case data object, wherein the historical data record comprises historical data previously included within at least one of the plurality of updatable fields.

In various embodiments, the computer program instructions are further configured to, when executed by a processor, cause the processor to: identify received update data as reconciling the corresponding exception case data object; transmit an approval request data object to at least one of the plurality of associated data sources; and upon receipt of approval data in response to the approval request data object, close the corresponding exception case data object.

In certain embodiments, the assigned user identifier is identified as one of the plurality of associated data sources. In various embodiments, generating a graphical user interface comprises generating a graphical user interface accessible via a user computing entity associated with the assigned user identifier. In certain embodiments, the computer program instructions are further configured to, when executed by a processor, cause the processor to generate a summary graphical user interface reflecting a plurality of exception case data objects associated with the user identifier. Moreover, the computer program instructions may be further configured to, when executed by a processor, cause the processor to automatically identify a link between at least two of the plurality of exception case data objects to at least partially reconcile the at least two of the plurality of exception case data objects, and wherein data indicative of the link is stored within each of the at least two of the plurality of exception case data objects.

BRIEF DESCRIPTION OF THE SEVERAL VIEWS OF THE DRAWINGS

Reference will now be made to the accompanying drawings, which are not necessarily drawn to scale, and wherein:

FIGS. 6-11 are example screenshots illustrating graphical user interfaces providing information relating to reconciliation of one or more transactions in accordance with certain embodiments.

DETAILED DESCRIPTION

Figure 1:
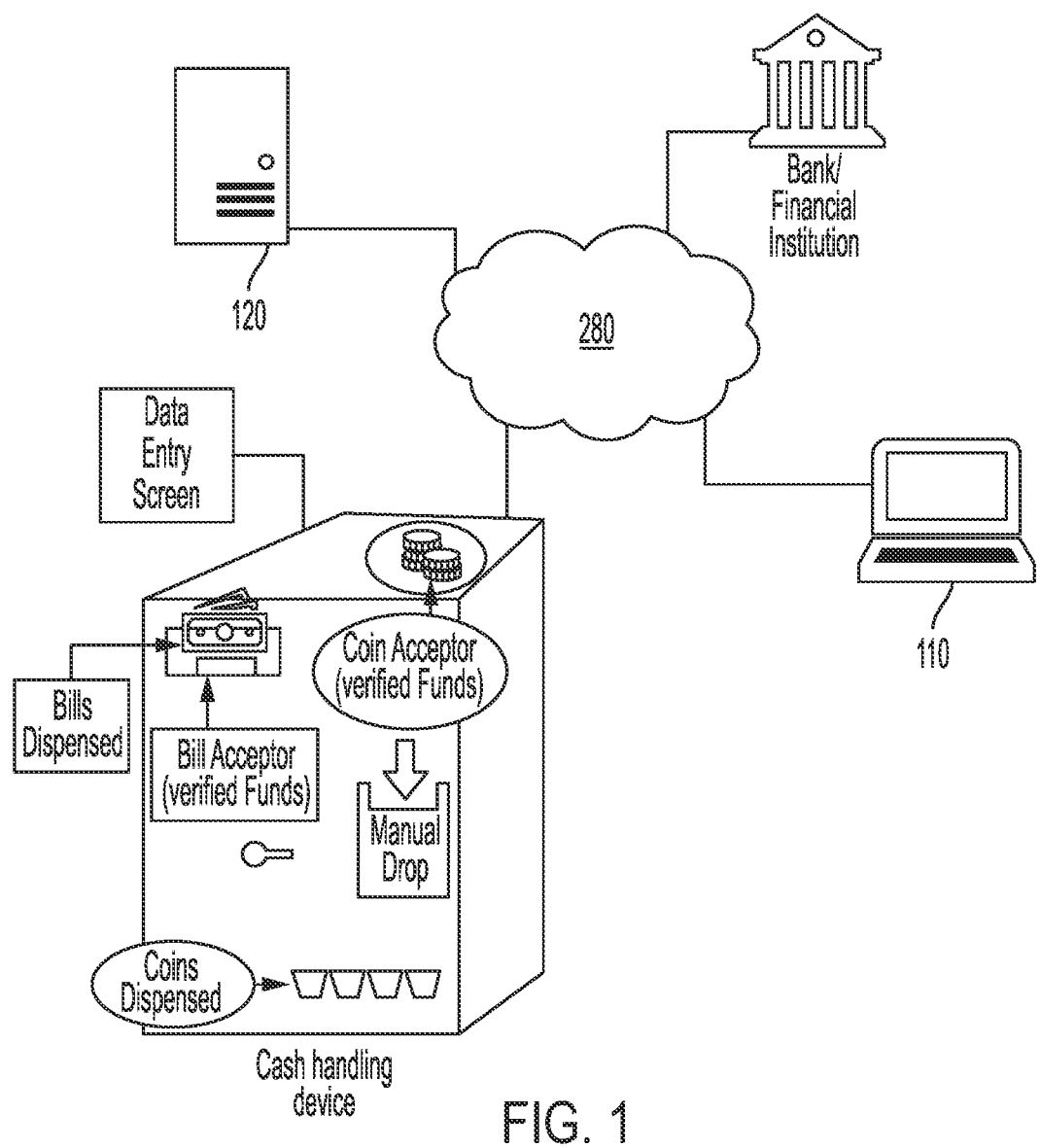
FIG. 1 illustrates a network environment in which data may be transferred regarding the functionality of a cash handling device according to certain embodiments.

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

Overview

To enable automated reconciliation of certain transactions identified as missing relevant information to enable closure thereof, various embodiments receive transaction data, such that a monitoring server is provided for automatically identifying transactions lacking sufficient information to enable closure thereof, and for automatically generating reconciliation case data objects for those identified transactions. As a part of generating the reconciliation case data objects, the monitoring server is configured for automatically identifying one or more data sources relevant for the transaction (and corresponding reconciliation case data object). The monitoring server may be configured for adding and/or updating data stored within the reconciliation data object upon receipt of data from one or more of the data sources relevant for the transaction. In certain embodiments, the resulting reconciliation data objects may comprise a plurality of immutable data records that cannot be modified or deleted after generation, thereby establishing an audit trail for data associated with reconciliation of certain transactions.

In certain embodiments, the monitoring server may be configured for executing a reconciliation methodology comprising a plurality of reconciliation processes executed in series, such that the monitoring server is configured to stop execution of the reconciliation processes upon receipt of data sufficient to reconcile the transaction. Moreover, the monitoring server may be configured to update an interactive user interface to reflect a current status of the reconciliation methodology. Moreover, the interactive user interface may comprise one or more user-interface elements providing data indicative of a current status of data requests provided to each of a plurality of the automatically identified data sources.

Computer Program Products, Methods, and Computing Entities

Embodiments of the present invention may be implemented in various ways, including as computer program products that comprise articles of manufacture. Such computer program products may include one or more software components including, for example, software objects, methods, data structures, and/or the like. A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform. Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, and/or a report writing language. In one or more example embodiments, a software component comprising instructions in one of the foregoing examples of programming languages may be executed directly by an operating system or other software component without having to be first transformed into another form. A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution). The terms software, computer program product, and similar words may be used herein interchangeably.

A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media/memory).

In one embodiment, a non-volatile computer-readable storage medium may include a floppy disk, flexible disk, hard disk, solid-state storage (SSS) (e.g., a solid state drive (SSD), solid state card (SSC), or solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-recordable (CD-R), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary System Architecture

FIG. 1 provides an illustration of an exemplary embodiment of the present invention. As shown in FIG. 1, this particular embodiment may include one or more monitoring servers 120, one or more mobile devices 110, one or more cash handling devices as discussed herein, one or more networks 280 enabling communication among computing devices and a banking institution (e.g., a banking institution server system), and/or the like. Each of these components, entities, devices, systems, and similar words used herein interchangeably may be in direct or indirect communication with, for example, one another over the same or different wired or wireless networks. Additionally, while FIG. 1 illustrates the various system entities as separate, standalone entities, the various embodiments are not limited to this particular architecture.

Monitoring Server

Figure 2:
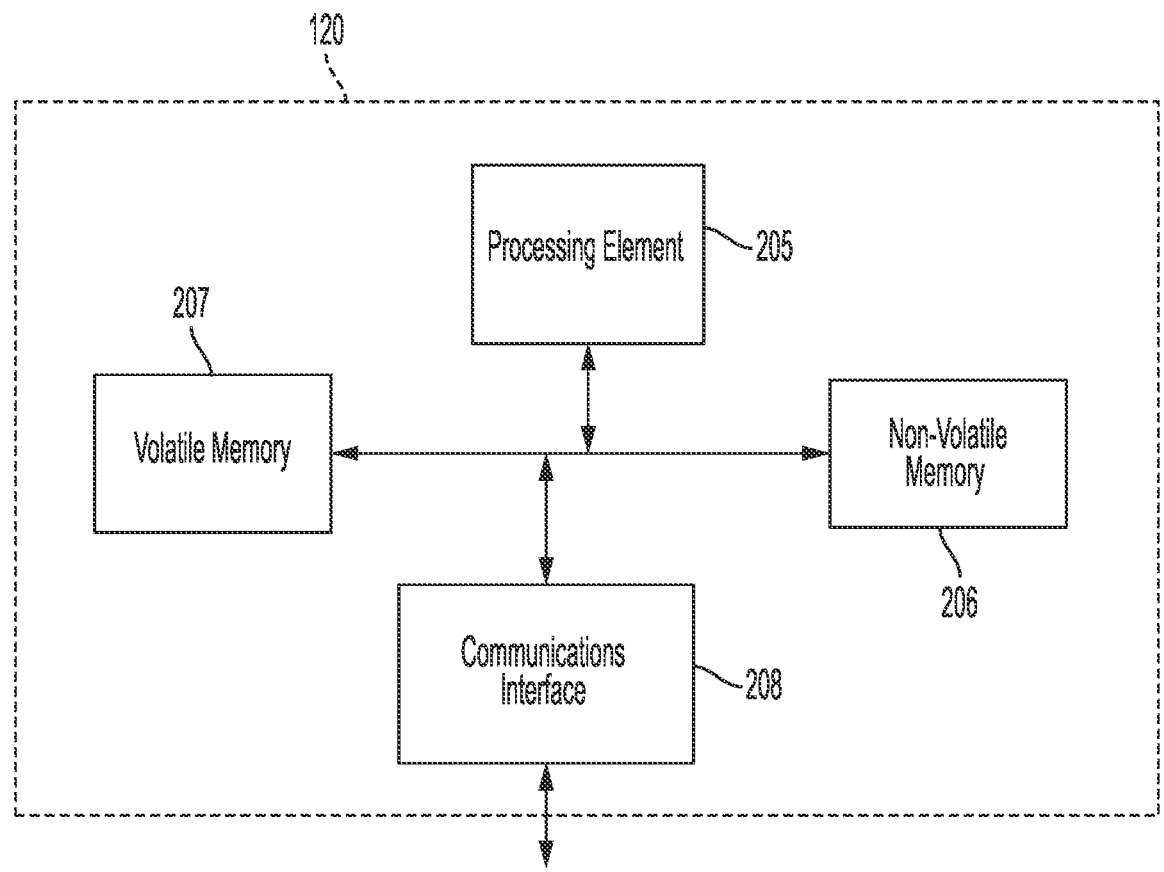
FIG. 2 schematically illustrates features of a monitoring server according to certain embodiments.

FIG. 2 provides a schematic of a monitoring server 120 according to one embodiment of the present invention. In one embodiment, the monitoring server 120 may be in network communication with one or more cash handling devices for monitoring transactions occurring in association with those cash handling devices, one or more banking institutions to transmit transaction data to appropriate banking institutions and/or one or more mobile devices 110 to provide various summary data thereto. In certain embodiments, the monitoring server 120 may be operable in association with other computing devices and/or platforms (e.g., operable via third parties, such as banking institutions' online banking platforms) to accomplish certain functions (e.g., user authentication) to retrieve certain data, and/or the like. In general, the terms computing entity, computer, entity, device, system, server, machine, and/or similar words used herein interchangeably may refer to, for example, one or more computers, computing entities, desktop computers, mobile phones, tablets, phablets, notebooks, laptops, distributed systems, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, controlling, remotely controlling, dispensing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

In one embodiment, the monitoring server 120 may include or be in communication with one or more monitoring server data repositories and/or one or more processing elements 205 (also referred to as processors, processing circuitry, processing device, and/or similar terms used herein interchangeably) that communicate with other elements within the monitoring server 120 via a bus, for example. In certain embodiments, the monitoring server data repositories may maintain a wide variety of data accessible to the monitoring server 120, such as user-specific items (e.g., user (login) ID, password (or other authentication credential(s)), one or more account number(s), user name, user registration status, and/or the like). As will be understood, the processing element 205 may be embodied in a number of different ways. For example, the processing element 205 may be embodied as one or more complex programmable logic devices (CPLDs), "cloud" processors, microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media/memory or otherwise accessible to the processing element 205. As such, whether configured by hardware or computer program products, or by a combination thereof, the processing element 205 may be capable of performing steps or operations according to embodiments of the present invention when configured accordingly.

In one embodiment, the monitoring server 120 may further include or be in communication with non-volatile media/memory (also referred to as non-volatile storage, memory, memory storage, memory circuitry and/or similar terms used herein interchangeably). In one embodiment, the non-volatile storage or memory may include one or more non-volatile storage or memory media 206, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. The term database, database instance, database management system, and/or similar terms used herein interchangeably may refer to a collection of records or information/data that is stored in a computer-readable storage medium using one or more database models, such as a hierarchical database model, network model, relational model, entity-relationship model, object model, document model, semantic model, graph model, and/or the like.

In one embodiment, the monitoring server 120 may further include or be in communication with volatile media/memory (also referred to as volatile storage, memory, memory storage, memory circuitry and/or similar terms used herein interchangeably). In one embodiment, the volatile storage or memory may also include one or more volatile storage or memory media 207, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the monitoring server 120 with the assistance of the processing element 205 and operating system.

As indicated, in one embodiment, the monitoring server 120 may also include one or more communications elements/interfaces 208 for communicating with various computing entities, such as by communicating data, content, information, and/or similar terms used herein interchangeably that can be transmitted, received, operated on, processed, displayed, stored, and/or the like. For instance, the monitoring server 120 may communicate with one or more mobile devices 110, one or more cash handling devices, one or more networks 280, one or more banking institutions' computing systems, and/or the like.

In certain embodiments, the monitoring server 120 may be configured to receive data from a plurality of data sources with respect to cash inventory stored at a particular cash handling device. For example, the cash handling device may provide data indicative of aggregate inputs and outputs of cash to the machine, while a user computing device may provide data indicative of how the aggregate inputs and outputs are divided among a plurality of retail tills (or registers, the terms being utilized herein interchangeably) (e.g., usable with respective POS devices). Accordingly, the monitoring server 120 may be configured to provide till-level inventory tracking configurations based at least in part on the aggregate amount of cash input to or output from a particular cash handling device, as well as manually generated data provided from a user computing entity indicative of how the cash was distributed from/to a various tills.

As indicated, in one embodiment, the monitoring server 120 may also include one or more communications interfaces 208 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the monitoring server 120 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1×(1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth protocols, wireless universal serial bus (USB) protocols, and/or any other wireless protocol. The monitoring server 120 may use such protocols and standards to communicate using Border Gateway Protocol (BGP), Dynamic Host Configuration Protocol (DHCP), Domain Name System (DNS), File Transfer Protocol (FTP), Hypertext Transfer Protocol (HTTP), HTTP over TLS/SSL/Secure, Internet Message Access Protocol (IMAP), Network Time Protocol (NTP), Simple Mail Transfer Protocol (SMTP), Telnet, Transport Layer Security (TLS), Secure Sockets Layer (SSL), Internet Protocol (IP), Transmission Control Protocol (TCP), User Datagram Protocol (UDP), Datagram Congestion Control Protocol (DCCP), Stream Control Transmission Protocol (SCTP), HyperText Markup Language (HTML), and/or the like.

Although not shown, the monitoring server 120 may include or be in communication with one or more input elements, such as a keyboard input, a mouse input, a touch screen/display input, motion input, movement input, audio input, pointing device input, joystick input, keypad input, and/or the like. In one embodiment, the monitoring server 120 may also include or be in communication with one or more output elements (not shown), such as audio output, video output, screen/display output, motion output, movement output, and/or the like.

As will be appreciated, one or more of the monitoring server's 120 components may be located remotely from other monitoring server 120 components, such as in a distributed system. Furthermore, one or more of the components may be combined and additional components performing functions described herein may be included in the monitoring server 120. Thus, the monitoring server 120 can be adapted to accommodate a variety of needs and circumstances. As will be recognized, these architectures and descriptions are provided for exemplary purposes only and are not limiting to the various embodiments.

Exemplary Mobile Device

In one embodiment, a user may be an individual, a representative of a customer, such as a company or organization, and/or the like who wants to deposit and/or withdraw cash from a cash handling device as discussed above. The user may interact with a cash handling device via a user interface thereon, and/or the user may interact with a mobile device 110 to obtain information/data regarding one or more accounts to which the user has access. As will be recognized, an account associated with a cash handling device may be any of a number of different account types, including a bank-owned cash account, a non-bank owned cash account, and/or the like. Accounts may be associated and/or linked with any of a variety of banking institutions holding accounts on behalf of a customer. Moreover, an account could be associated with more than one user (e.g., a plurality of employees associated with a customer holding an account), and each user may have different account access credentials (e.g., a first user may have withdrawal and deposit access and a second user may have deposit only access to an account). Moreover, each user may have access to an account via different access identifiers (e.g., different user identifiers), or in certain embodiments each user may have access to the account via an identical access number. In other embodiments, a single user identifier may be associated with more than one account (e.g., accounts associated with a plurality of departments within a commercial customer).

Figure 3:
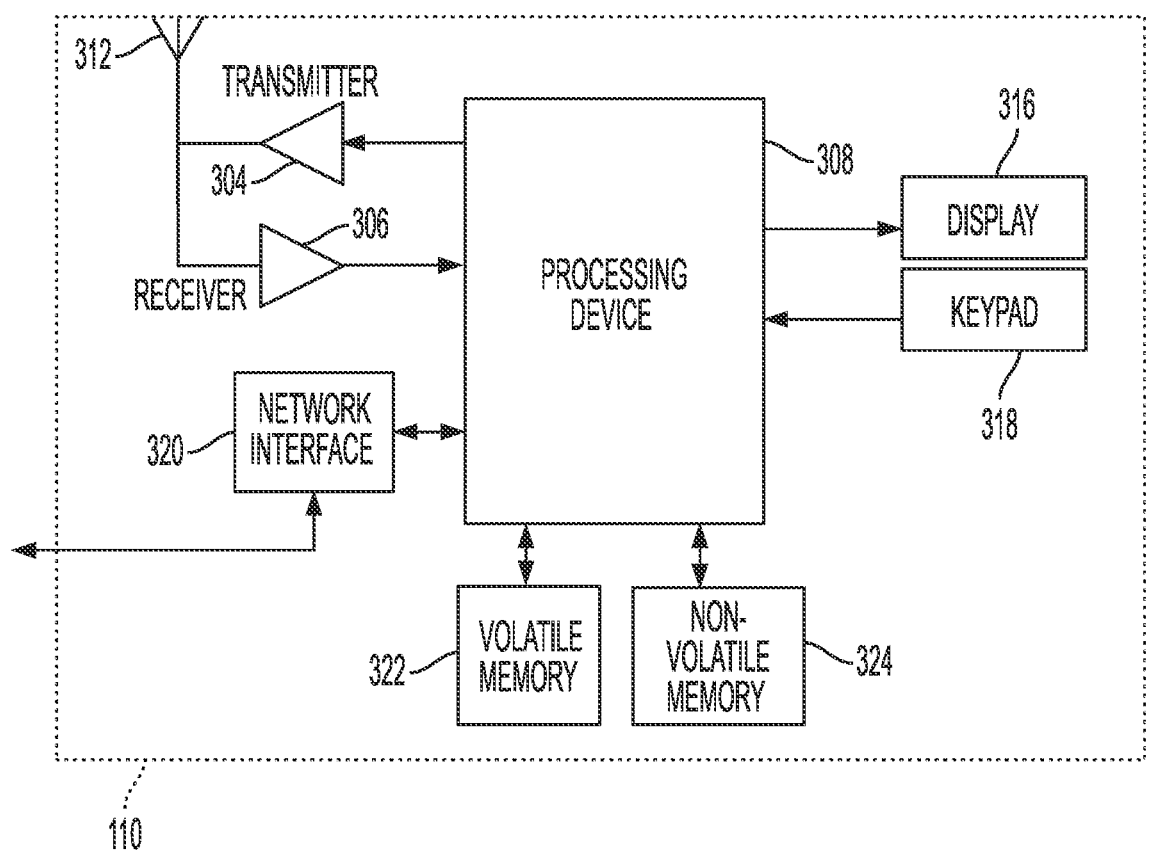
FIG. 3 schematically illustrates features of a handheld device according to certain embodiments.

The mobile device 110 includes one or more components that are functionally similar to those of the monitoring server 120. FIG. 3 provides an illustrative schematic representative of a mobile device 110 that can be used in conjunction with embodiments of the present invention. As noted previously, the terms device, system, computing entity, entity, server, and/or similar words used herein interchangeably may refer to at least, for example, one or more computers, computing entities, mobile phones, tablets, phablets, watches, glasses, ear pieces, wristbands, wearable items/devices, the like, and/or any combination of devices or entities adapted to perform the functions, operations, and/or processes described herein. As shown in FIG. 3, the mobile device 110 can include an antenna 312, a transmitter 304 (e.g., radio), a receiver 306 (e.g., radio), and a processing element 308 (e.g., CPLDs, microprocessors, multi-core processors, cloud processors, coprocessing entities, ASIPs, microcontrollers, and/or controllers) that provides signals to and receives signals from the transmitter 304 and receiver 306, respectively.

In one embodiment, the signals provided to and received from the transmitter 304 and the receiver 306, respectively, may include signaling information/data in accordance with air interface standards of applicable wireless systems. In this regard, the mobile device 110 may be capable of operating with one or more air interface standards, communication protocols, modulation types, and access types. More particularly, the mobile device 110 may operate in accordance with any of a number of wireless communication standards and protocols, such as those described above with regard to the monitoring server 120. In a particular embodiment, the mobile device 110 may operate in accordance with multiple wireless communication standards and protocols, such as UMTS, CDMA2000, 1×RTT, WCDMA, GSM, EDGE, TD-SCDMA, LTE, E-UTRAN, EVDO, HSPA, HSDPA, Wi-Fi, Wi-Fi Direct, WiMAX, UWB, IR, NFC, Bluetooth, USB, and/or the like. Similarly, the mobile device 110 may operate in accordance with multiple wired communication standards and protocols, such as those described above with regard to the monitoring server 120 via a network interface 320.

Via these communication standards and protocols, the mobile device 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). In one embodiment, the mobile device 110 can also download changes, add-ons, and updates, for instance, to its firmware, software (e.g., including executable instructions, applications, program modules), and operating system.

According to one embodiment, the mobile device 110 may include location determining aspects, devices, modules, functionalities, and/or similar words used herein interchangeably. For example, the mobile device 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites (e.g., using global positioning systems (GPS)). In one embodiment, the satellites may be a variety of different satellites, including Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (UPS) coordinate systems; and/or the like. Alternatively, the location information/data can be determined by triangulating the mobile device's 110 position in connection with a variety of other systems, including cellular towers, Wi-Fi access points, and/or the like. Similarly, the mobile device 110 may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Bluetooth Smart, Wi-Fi Direct transmitters, NFC transmitters, and/or the like. These indoor positioning aspects can be used in a variety of settings to determine the location of someone or something to within inches or centimeters.

In one embodiment, the mobile device 110 may also comprise a user interface (that can include a display 316 coupled to a processing element 308) and/or a user input interface (coupled to a processing element 308). For example, the user interface may be a user application, browser, user interface, interface, and/or similar words used herein interchangeably executing on and/or accessible via the mobile device 110 to interact with and/or cause display of information/data from the monitoring server 120, as described herein. The user input interface can comprise any of a number of devices or interfaces allowing the mobile device 110 to receive data, such as a keypad 318 (hard or soft), a touch display, voice/speech or motion interfaces, or other input device. In embodiments including a keypad 318, the keypad 318 can include (or cause display of) the conventional numeric (0-9) and related keys (#, *), and other keys used for operating the mobile device 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

In certain embodiments, the user interface (e.g., the display 316) may be configured for displaying access credentials that may be presented to a cash handling device to enable the user to gain account access via the cash handling device. For example, the user interface of the mobile device 110 may be utilized to display a QR code, a bar code, an image, and/or the like that is machine-readable and indicative of the user's access credentials. Similarly, the mobile device 110 may be configured for storing access credentials thereon, and transmitting those access credentials via any of a variety of wireless data transmission protocols (e.g., Bluetooth, Wi-Fi, NFC, and/or the like) to the cash handling device to provide access credentials for the user to the cash handling device.

The mobile device 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the mobile device 110. As indicated, this may include a user application that is resident on the entity or accessible through a browser or other user interface for communicating with the monitoring server 120 and/or various other computing entities.

As will be recognized, the mobile device 110 may include one or more components or functionality that are the same or similar to those of the monitoring server 120, as described in greater detail above. As will be recognized, these architectures and descriptions are provided for exemplary purposes only and are not limiting to the various embodiments.

Cash Handling Device Hardware

Figure 4:
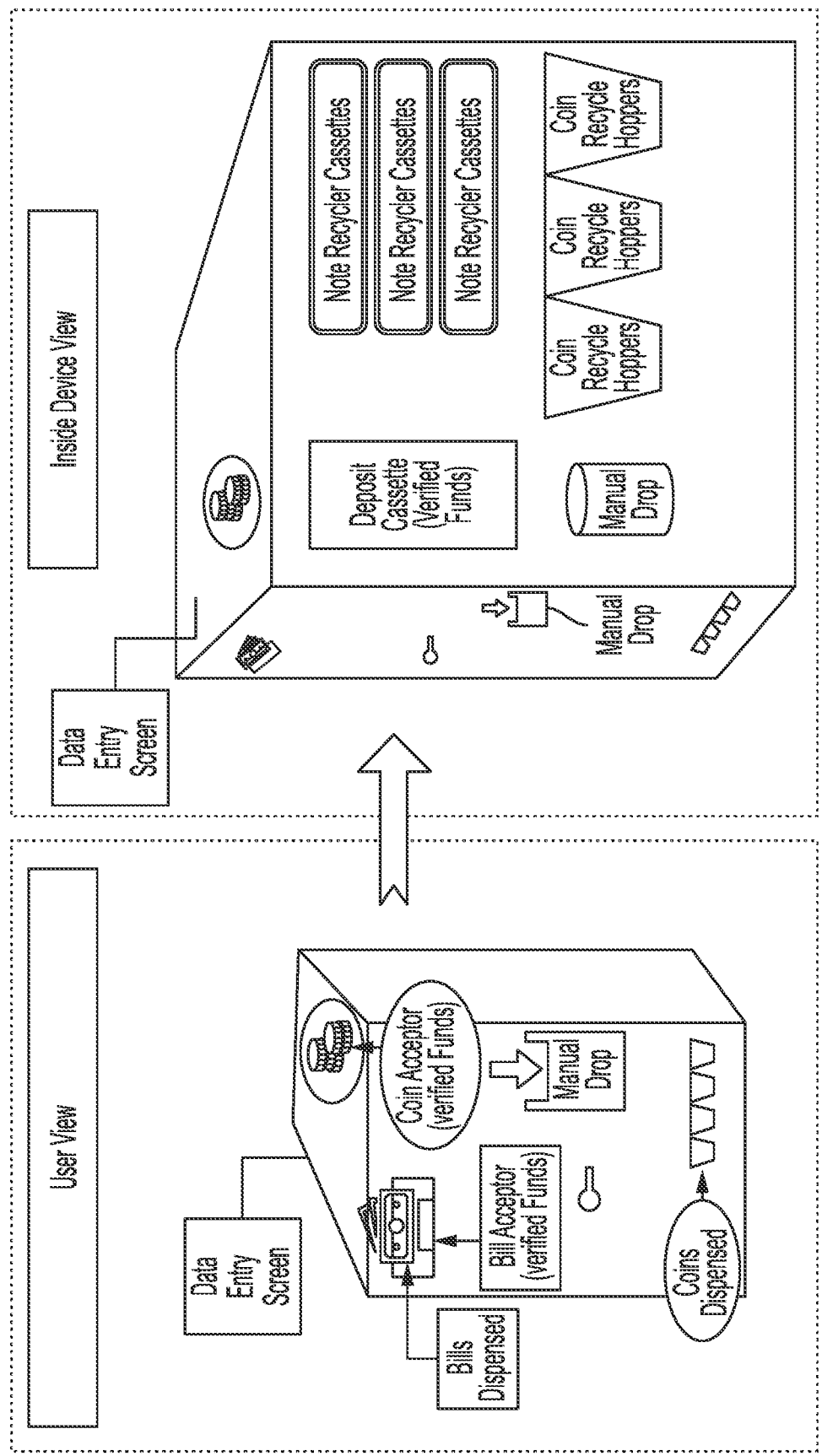
FIG. 4 schematically illustrates features of a cash handling device according to certain embodiments.

An example cash handling device is shown schematically at FIG. 4. As shown therein, components of the cash handling device are disposed within and/or on a housing. The cash handling device may comprise a user interface (e.g., an LCD monitor, a PIN-pad, and/or the like), one or more data readers (e.g., a card reader, a barcode reader, an NFC reader, a camera (which may also be utilized for recording security footage), and/or the like), one or more currency outputs (e.g., a coin dispenser, such as a rolled coin dispenser or a loose coin dispenser, a note dispenser, such as a loose note dispenser or a bound-note dispenser, and/or the like), one or more currency and/or negotiable instrument inputs (e.g., a coin recycler, a check/note scanner/recycler, a deposit cassette, and/or the like), a receipt printer, and/or the like.

The cash handling device components collectively enable a user (e.g., a representative of a particular commercial establishment customer having an account accessible via the cash handling device) to deposit and/or withdraw funds from the cash handling device (which may result in corresponding changes to an account balance in an account held at a particular banking institution for the commercial establishment). In certain embodiments, the cash handling device may enable users to withdraw currency in requested quantities and denominations (e.g., requested quantities of each of a plurality of denominations). Users may interact with the cash handling device via the one or more user interface mechanisms to (1) provide user identifying data (e.g., via the one or more data readers, the PIN pad, a touch screen, and/or the like), and (2) to provide data indicative of a requested transaction to be performed with the cash handling device.

In certain embodiments, a plurality of users may be associated with a single account with the cash handling device, and each of those users may be associated with differing account access levels. For example, a first user may have deposit and withdrawal access for a particular account, while a second user may only have deposit access for the particular account. Data indicative of the access credentials for each user may be stored locally in a non-transitory memory of the cash handling device, on a memory within a physical identification token (e.g., a card) carried by the user, and/or the like.

With reference to FIG. 4, which illustrates a schematic view of various components of a cash handling device according to one embodiment, the cash handling device may comprise one or more components of a note (e.g., note) circulation system and one or more components of a coin circulation system.

In the illustrated embodiment, the note circulation system encompasses a note acceptor configured for providing notes to a user and/or for accepting notes deposited by a user. The note acceptor may be configured for processing a plurality of notes simultaneously (e.g., presented to the note acceptor in a stack) to speed transactions with the user. Notes passed between the note acceptor and one or more note recycler cassettes and/or deposit cassettes (illustrated in FIG. 4) are counted, imaged, and/or otherwise verified to monitor the quantity of notes deposited/withdrawn, as well as the denomination of those notes. Through the verification mechanism of the note acceptor, the note circulation system may be configured to separate out negotiable instruments (e.g., checks) and/or certain notes for direction to separate storage locations, and/or to separate out and return unreadable notes and/or unreadable negotiable instruments to a user. In certain embodiments, those unreadable notes and/or unreadable negotiable instruments may be resubmitted by the user via a manual drop system, and the user may manually provide information regarding the denomination of the particular notes provided to the cash handling device via the manual drop.

As is particularly relevant for deposits, the note acceptor may be configured to segregate notes by denomination prior to providing those notes to a note recycler and/or deposit cassette. The segregated notes may be stored in separate storage locations (e.g., separated portions of a recycler cassette and/or separated portions of a deposit cassette) such that the notes may be easily recycled based on denomination for later transactions if needed. In certain embodiments, the separate storage locations may comprise separate deposit cassettes, separate recycler cassettes, and/or separated portions of a deposit cassette and/or recycler cassette. As a specific example utilized with U.S. currency, a cash handling device may comprise two cassettes (deposit cassettes, recycler cassettes, or both) configured for receiving and/or dispensing $1 bills, a third cassette (deposit, recycler, or both) configured for receiving and/or dispensing $5 bills, a fourth cassette (deposit, recycler, or both) configured for receiving and/or dispensing $20 bills, a fifth cassette (deposit, recycler, or both) divided into separate sections, a first section for receiving and/or dispensing $5 bills and a second section for receiving and/or dispensing $10 bills. A sixth cassette (deposit only) may be configured for receiving overflow of any denomination of note (including $1, $2, $5, $10, $20, $50, and $100) when a respective denomination-specific cassette is full and/or if no denomination specific cassette is provided for a particular note. For clarity, a cash handling device may comprise deposit only cassettes having the above-referenced configuration, recycler only cassettes having the above-referenced configuration (except for the deposit-only overflow cassette) or may have two sets of cassettes having the above-referenced configuration (e.g., a first set of deposit cassettes having the above-referenced configuration and a second set of recycler cassettes having the above-referenced configuration, but without the overflow cassette). It should be understood that the configuration of specific denomination-specific cassettes mentioned above is presented as an example only, and any combination of denomination-specific cassettes may be utilized.

In certain embodiments, all notes received from the note acceptor during deposit transactions are first directed to a note recycler cassette for storage therein. Notes may be redirected from a recycler cassette to a deposit cassette to remove those notes from circulation upon the occurrence of one or more trigger events, such as a quantity of notes (e.g., a quantity of a given denomination of notes) exceeding a threshold quantity or upon receipt of user input requesting that notes are moved to the deposit cassette. Moreover, as discussed herein, movement of notes to a deposit cassette may itself be a trigger event for various tasks to be performed by the cash handling device or a networked monitoring system, such as transmitting data to a banking institution to direct funds into a particular account at the banking institution.

In certain embodiments, each time notes are moved within the cash handling device, the notes may pass through a quantity and/or denomination verification system to automatically monitor the amount of currency moving between the various portions of the cash handling device, thereby enabling the cash handling device to maintain an accurate count of the amount of currency in each denomination contained therein.

With reference now to the coin circulation system, the cash handling device may comprise a coin acceptor configured to accept coins deposited by a user of the cash handling device (e.g., accepting rolled coins and/or loose coins). The coin acceptor may have a rejection tray configured to return any unrecognizable coins deposited by the user. Moreover, the coin acceptor comprises a counting and/or verification system configured for counting the quantity and denomination of coins provided via the coin acceptor. Coins may then be passed to one or more coin recycle hoppers (e.g., which may comprise open trays, roll-creating hoppers, and/or the like) for storage within the cash handling device. In certain embodiments, those coin recycle hoppers may be configured for selectably dispensing coins as needed to fulfill a withdrawal request (e.g., as loose coins or as rolled coins). In such embodiments, the coins may be passed to one or more coin dispensing trays (e.g., coin roll dispensing trays or loose coin dispensing trays) for presentation to the user.

Like the note recyclers mentioned above, the cash handling device may comprise a plurality of denomination specific coin hoppers for storage of deposited coins. For example, a cash handling device may comprise a two coin hoppers configured for storing $0.01 coins therein, another two coin hoppers configured for storing $0.05 coins therein, a fifth coin hopper configured for storing $0.10 coins therein, sixth and seventh coin hoppers configured for storing $0.25 coins therein, and an eighth, overflow coin hopper configured for storing coins of any denomination (such as $0.01, $0.05, $0.10, $0.25, $0.50, and $1). A cash handling device may comprise deposit only coin hoppers having the above configuration, recycler coin hoppers having the above configuration, or both recycler coin hoppers and deposit coin hoppers having the above configuration. Moreover, the configuration of denominations of coin hoppers discussed herein is provided merely as an example, any combination of denomination-specific coin hoppers may be utilized.

Moreover, the cash handling device may comprise a manual drop circulation system comprising a manual drop acceptor configured to accept notes and/or negotiable instruments provided by the user, and a manual drop storage cassette. The manual drop acceptor may operate in conjunction with the user interface, such that the manual drop may associate user-provided information regarding the quantity of a particular manual drop (e.g., value, quantity of a particular currency, and/or the like) with notes accepted via the manual drop. In certain embodiments, the manual drop cassette may be configured to separate each collection of notes accepted via the manual drop, such that the user-provided information regarding the quantity of currency provided via the manual drop may remain reflective of an amount of currency stored within a particular separated collection of notes. The manual drop may be a deposit only system, such that notes are not recycled to users from the manual drop cassette.

Although not shown, the cash handling device may be configured for automatically providing cash into a cashier tray (e.g., a tray to be utilized with a cash register at a Point-of-Sale (POS) terminal). In such embodiments, the cashier tray may be supported within the cash handling device, and the cash handling device may selectably deposit quantities of notes and coins of select denominations into segmented portions of the cashier tray.

Moreover, the cash handling device comprises a receipt printer configured for printing physical receipts that may be usable by individual users and/or during change order processing as discussed herein.

Cash Handling Device Controller

A cash handling device having the physical configuration discussed herein may have one or more onboard computing controllers configured for performing various functions and/or for controlling the functionality of various components of the cash handling device. In one embodiment, the cash handling device controller is embodied as a computing entity that may have a configuration similar to the mobile device 110 discussed above, and which may be configured to support processing in connection with deposit and withdrawal transactions for funds via the cash handling device. The one or more cash handling device controllers may include computing device(s) that are local to a corresponding cash handling device and/or computing device(s) that are remotely located. At least one of the cash handling device controllers may be configured to access and store information/data in at least one of one or more datastores to perform processing supported by the cash handling device.

Exemplary Networks

In one embodiment, any two or more of the illustrative components of the architecture of FIG. 1 may be configured to communicate with one another via respective communicative couplings to one or more networks 280. The networks 280 may include, but are not limited to, any one or a combination of different types of suitable communications networks such as, for example, cable networks, public networks (e.g., the Internet), private networks (e.g., frame-relay networks), wireless networks, cellular networks, telephone networks (e.g., a public switched telephone network), or any other suitable private and/or public networks. Further, the networks 280 may have any suitable communication range associated therewith and may include, for example, global networks (e.g., the Internet), metropolitan area networks (MANs), wide area networks (WANs), local area networks (LANs), or personal area networks. In addition, the networks 280 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof, as well as a variety of network devices and computing platforms provided by network providers or other entities.

Transmissions over networks 280 may be "in the clear" or may leverage one of more of a variety of industry-standard or third-party security technologies implemented in any of the OSI layers used. If encryption is used, it may be symmetric or asymmetric (or implement a combination of the two, as in SSL/TLS, where the initial handshake uses asymmetric encryption in the exchange of symmetric keys, and subsequent transactions use symmetric encryption based on the previously exchanged symmetric keys). As will be recognized, process interaction over a network may be synchronous or asynchronous: synchronous—processes are coupled and include web services (e.g., SOAP), which may in turn leverage http(s); and various other remote procedure call (RPC), middleware protocols, industry-standard exchange formats (e.g., XML or JSON), and integration architectures (e.g., REST) and/or asynchronous—processes are decoupled and mechanisms include message queues and file transfers.

Exemplary System Operation

Figure 5:
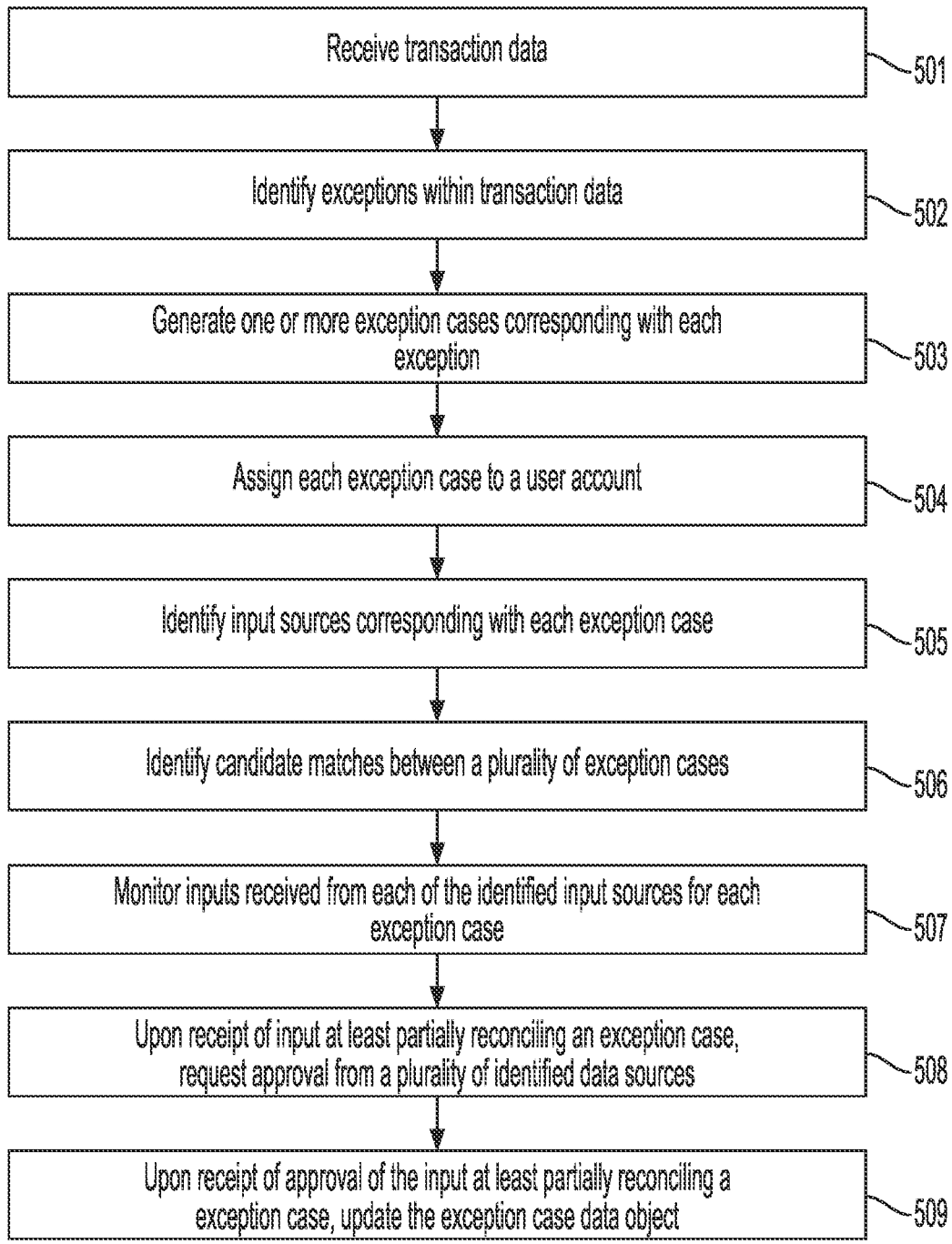
FIG. 5 is a flowchart illustrating example steps for reconciling one or more transactions in accordance with certain embodiments.

FIG. 5 is a flowchart illustrating example steps associated with automatically reconciling one or more transactions which otherwise lacks sufficient information for reconciliation in the course of typical transaction review, such as at the close of business at a retail establishment. The methodology reflected within the flowchart of FIG. 5 has corresponding interactive graphical user interface representations to provide a user of the systems and methods discussed herein with relevant status information relating to the processes utilized for reconciling transactions. Example interactive graphical user interfaces are reflected within FIGS. 6-11.

As reflected within Block 501 of FIG. 5, the monitoring server is configured for receipt of transaction data relating to a plurality of transactions. Although certain embodiments operate specifically for maintaining data relating to cash transactions so as to reconcile amounts of cash within various devices (e.g., cash handling devices, point-of-sale devices, financial-institution operated devices, and/or the like), the received transaction data may encompass data relating to both cash and non-cash related transactions, and the monitoring server may thus extract cash-related transaction data from the received transaction data for further processing.

The cash-related transaction data (subsequently referred to herein as "transaction data") comprises data indicative of quantities of cash removed, added, or moved within and/or involving a cash handling device as discussed herein. The transaction data may be embodied as a plurality of transaction data objects each relating to a single corresponding transaction and may comprise data indicative of the corresponding transaction. The transaction data objects may each comprise data indicative of a date/time of execution of the transaction, a quantity of cash (e.g., at a denominational level) involved in the transaction, data indicative of the transaction type (e.g., withdrawal, deposit, transfer, and/or the like), data indicative of a transaction location (e.g., a unique identifier associated with a cash handling device, a descriptive location of the cash handling device, and/or the like), data indicative of one or more accounts associated with the transaction (e.g., a customer identifier, a financial institution account, a financial institution name, and/or the like), a user identifier associated with the transaction (e.g., a unique user identifier accessing the device at the time the transaction was executed), and/or the like.

The transaction data may be received from a cash handling device and/or from a memory storage area associated with the monitoring server. Moreover, the transaction data may be received together with additional machine-specific data, which may be indicative of a quantity of cash located within one or more cash handling devices, within one or more point-of-sale terminals, and/or the like. Such data may be automatically reviewed by the monitoring server to identify exceptions as discussed herein, which may be indicative of a determination that a quantity of cash within a cash handling device (or other machine) does not match an expected amount of cash within the cash handling device based on the received transaction data.

In certain embodiments, the transaction data may be stored together with reconciling data indicating that a particular transaction has been appropriately reconciled, such as by matching the transaction data with additional matching data, such as an additional transaction data object reflecting a corresponding transaction (e.g., a withdrawal transaction from a point-of-sale terminal may be paired with a deposit transaction of a cash handling device for the same amount of cash), third-party transaction data (e.g., a deposit transaction at a cash handling device may be paired with a third-party withdrawal transaction data at a financial institution reflecting a withdrawal from a particular financial institution account for the same amount as the deposit into the cash handling device), and/or the like. Accordingly, the monitoring server may be configured for generating reconciling data to be stored together with transaction data based at least in part on additional transaction data generated by the monitoring server, and/or based at least in part on data received from a third party system (e.g., a financial institution).

The monitoring server may identify exceptions within or otherwise relating to the transaction data, for example, reflecting transaction data objects for which there is no reconciling data (or otherwise by identifying transaction data objects that are not entirely reconciled), as indicated at Block 502. Such exceptions may additionally reflect incomplete and/or unreconciled data received from a financial institution, such as data indicating deposits and/or withdrawals from a financial institution account associated with a particular customer for which there is no corresponding reconciling data generated by the monitoring server. The monitoring server may be configured to present these exceptions as exception cases having corresponding exception case data objects for display within an exception-related interactive graphical user interface (e.g., such as that displayed within FIG. 6), and for further processing as discussed herein.

In certain embodiments, exceptions may be identified within received data as being unconnected with individual transaction data objects, and such exceptions may be indicative of a greater out-of-balance state (e.g., the amount of funds within a particular cash handling device does not match an expected amount of cash within the device).

As indicated at Block 503 of FIG. 5, the monitoring server generates one or more exception cases corresponding with each identified exception, and each exception case being embodied as an exception case data object having data describing a plurality of characteristics of the exception. The exception case data objects may be generated and stored such that data may be added to the exception case data object (e.g., as text-based data, files generated by the monitoring server, files uploaded by a user, files provided by a third-party system (e.g., from a financial institution, and/or the like), however once added to the exception case data object, the data cannot be deleted, thereby creating an immutable record of an investigative process associated with reconciling an exception. As discussed herein, when generating a displayed graphical user interface relating to an exception case data object, the monitoring server may be configured to identify most-recently updated data of various data types within an exception case data object for display within updated fields relating to the exception case data object, while maintaining a record of historical data that may be accessed through appropriate historical data access methodologies (e.g., historical data graphical user interfaces).

In certain embodiments, the monitoring server may be configured to assign each exception data object to a particular user identifier (as reflected at Block 504), such as a user identifier corresponding with an investigator assigned to determine the root cause of the exception and to reconcile the exception upon determining the root cause. As the exception case data objects are assigned to particular users (and/or reassigned to other users), the monitoring server maintains an up-to-date record of a current user (or a current plurality of users) that may have access to the exception case data object, while also maintaining a historical record of those users that had access to the exception case data object in the past. User identifiers associated with those historically-associated users may be reflected within the historical data stored as a part of the exception case data object, however the user identifiers indicated within the historical data may not have access to the exception case data object.

In certain embodiments, data identifying the assigned users may be generated and added to the exception case data object automatically, for example based at least in part on one or more rule engines (e.g., correlating particular customer identifiers with particular investigator user identifiers, and/or the like). In certain embodiments, adding data indicative of a user identifier may comprise adding a plurality of user identifiers, such as a first user identifier associated with an investigator and a second user identifier associated with a supervisor.

As discussed in greater detail herein, the exception case data object may comprise data identifying an exception type, an exception amount, a transaction data of execution, a case number (which may be assigned automatically by the monitoring server), a customer identifier/name, a location identifier, a financial institution name/identifier, a transaction identifier assigned by a financial institution, a carrier assigned to the transaction (if applicable), and/or the like. Moreover, the exception case data object may additionally comprise data indicative of one or more action items to be completed during an investigation, and each of those action items may be assigned to certain entities (e.g., the investigator, the financial institution, the carrier, and/or the like).

As non-limiting examples, exception types may comprise: (1) out of balance—file (e.g., occurring when a cash handling device's end-of-day totals provided to a financial institution by the monitoring server do not match the prior day's balance plus (or minus) the net position change, the change order pay, and the funds removed from the device (missing erecord(s))); (2) out of balance—machine (e.g., occurring when transactions associated with a cash handling device do not match the contents of the device, which may be noted on reports generated by cash handling devices according to certain embodiments); (3) machine offline (e.g., occurring when the machine has been offline for a designated amount of time (e.g., 3 days, 4 days, 7 days, 30 days, and/or the like) and a financial institution indicates that a quantity of funds last reported within the cash handling device will be debited from a customer's account; (4) missing empty record (erecord) (e.g., occurring when a financial institution receives a deposit record (drecord) (e.g., from a carrier) and the drecord does not have a corresponding erecord for matching therewith); (5) missing drecord (e.g., occurring when the financial institution receives an erecord from the monitoring server but the financial institution does not receive a corresponding drecord); (6) deposit record variances (e.g., occurring when a drecord does not match a corresponding erecord); and/or the like.

Figure 6:
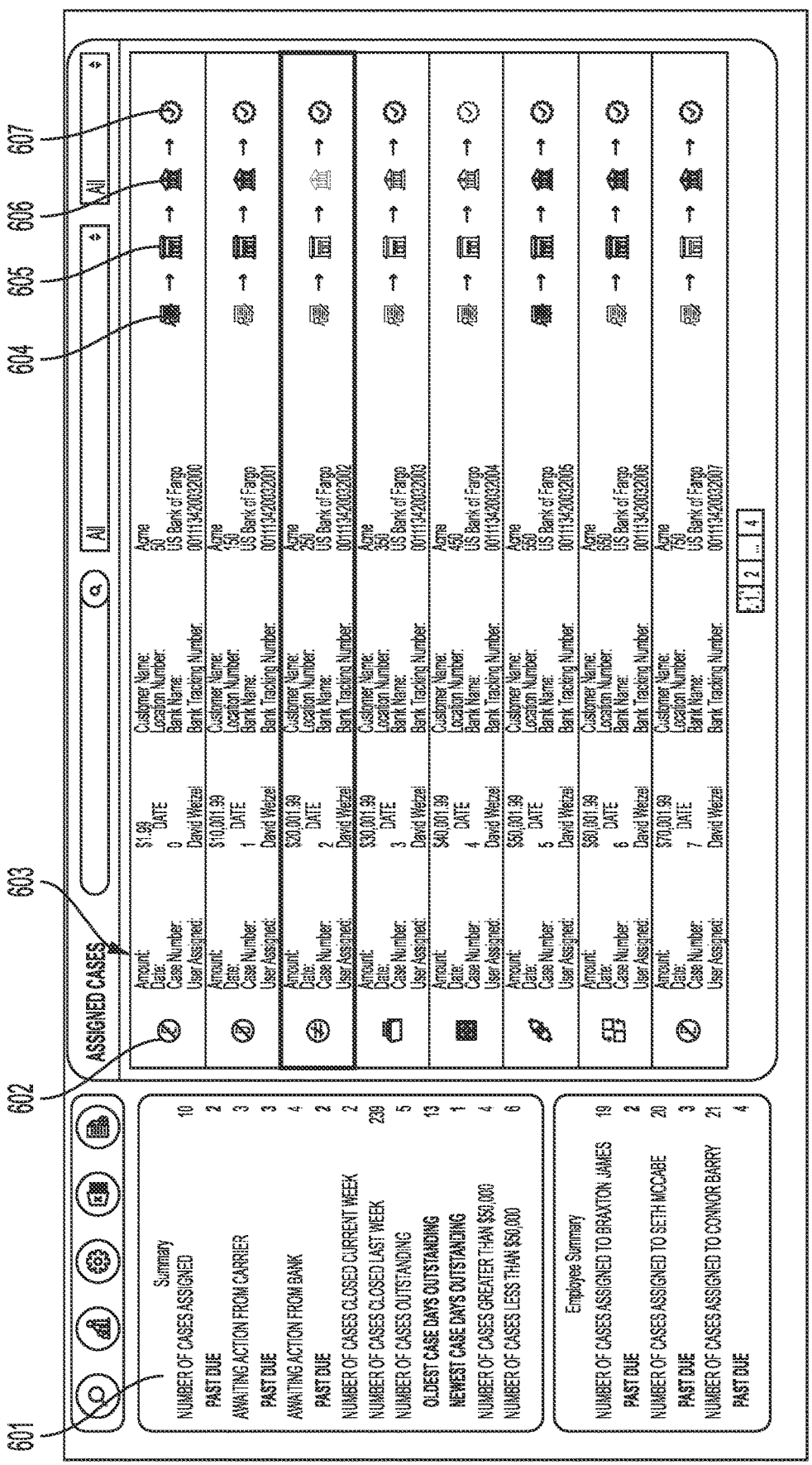

With reference to FIG. 6, the monitoring server is configured for generating and maintaining an interactive user interface corresponding to each user that compiles a listing of all exception cases assigned to the user. As noted above, the monitoring server is configured for reviewing data stored within each exception case data object to determine a most-recent identification of one more assigned users, such that the monitoring server grants access to the exception case data objects for only those currently-assigned users (and therefore the exception case data objects are reflected within a graphical user interface associated with those most-recently assigned users only, while historically-associated users are not provided with access to the exception case data objects). The monitoring server may be configured for generating analogous user interfaces for investigators, supervisors, customers (e.g., retailers for whom cash is managed through the monitoring server), financial institutions, and/or the like. However it should be noted that data organization within displays for each user type may vary to provide data in a most-relevant format for the particular user. The interactive user interface is configured for providing summary data within a summary data panel 601 providing data indicative of a quantity of cases having varying levels of action required for investigation/reconciliation. Moreover, the monitoring server is configured for assigning due dates to various actions as discussed in greater detail herein, and the status of each action relative to a respective due date is reflected within the summary panel 601.

In certain embodiments, the graphical user interface generated by the monitoring server further comprises a listing of exception cases relevant to the user (e.g., an investigator, a supervisor, a carrier, a financial institution, and/or the like). The listing may be arranged in any of a variety of orders, such as a date-based order (e.g., the oldest exception cases being listed first), an urgency-based order (e.g., any overdue exception cases being listed first), and/or the like. As a part of the displayed listing of exception cases, the graphical user interface comprises type indicia (e.g., such as the symbols 602) corresponding to a particular exception type for each exception displayed within the graphical user interface. Moreover, the illustrated example display of FIG. 6 additionally provides a status display timeline having corresponding symbols (e.g., symbols 604-607). The corresponding symbols may each correlate to a particular action item and/or entity having an action item for completion relative to the process of reconciling the exception data object.

With reference again to the process reflected within the flowchart of FIG. 5, the monitoring server is further configured to identify input sources for providing data relevant for reconciling each exception, as indicated at Block 505. By identifying relevant data sources that may provide updating data to a particular exception case data object, the monitoring server ensures that only relevant data may be added to the immutable exception case data object, thereby maintaining the investigative integrity of the exception case data object without providing unnecessary and/or irrelevant updates to the exception case data object. Relevant data sources may be particular user accounts corresponding with a financial institution, a carrier, an investigator, and/or the like. In certain embodiments, identifying relevant data sources may comprise reviewing the exception case data record to identify relevant entities associated with the exception case, and retrieving relevant data sources corresponding with those identified entities. Thereafter, receipt of data from an identified data source may be flagged by the monitoring server, causing the monitoring server to update a corresponding symbol on a graphical user interface to indicate that data has been received from a corresponding relevant data source. For example, upon receipt of data from a particular investigator (e.g., data provided to the monitoring server together with metadata identifying the investigator's user identifier), an identifier (e.g., symbol 604) may be updated to reflect receipt of data (e.g., changing from a grey color to a blue color). Upon receipt of data from a relevant carrier (e.g., data provided to the monitoring server together with metadata identifying the carrier's user identifier), an identifier (e.g., symbol 605) may be updated to reflect receipt of data (e.g., changing from a grey color to a blue color). Upon receipt of data from a relevant financial institution (e.g., data provided to the monitoring server together with metadata identifying the financial institution's user identifier), an identifier (e.g., symbol 606) may be updated to reflect receipt of data (e.g., changing from a grey color to a blue color). In certain embodiments, updating the corresponding indicator may only be completed based upon a determination that an expected type of data is received. Accordingly, the receipt of data from a relevant data source itself may not result in updating the relevant symbol. Moreover, receipt of data from a particular data source may thus be utilized for updating multiple symbols (e.g., first data received from an investigator as discussed above may result in an update to symbol 604 and second data received from the investigator as discussed above may result in an update to symbol 607).

Moreover, as discussed herein, the monitoring server is configured to enable additions of data to the exception case data object from the relevant data sources. By matching expected data sources (identified within the exception case data object) with metadata accompanying received data, the monitoring server is configured to appropriately adding the received data to a corresponding exception case data object, thereby minimizing necessary changes to the added data, and enabling implementation of an immutable data storage configuration, such that data added to the exception case data object cannot be modified or deleted. The resulting immutable exception case data object provides a record of reconciling a particular identified exception that may be relied upon later for audit purposes.

With reference again to FIG. 5, the monitoring server may be configured for automatically reviewing all exceptions, in the aggregate, to identify prospective matches between a plurality of exception cases. For example, a first exception case indicated as a missing drecord, and a second exception case indicated as a missing erecord may be indicated as a prospective match if the cash quantities involved are sufficiently similar. It should be understood that any pairs of missing drecord and missing erecords may be identified as potential matches, at least partially, as a quantity of cash associated with one of the missing records may correspond partially with the quantity of cash associated with another missing record (e.g., a lower cash amount may partially satisfy a record having a higher cash amount). In certain embodiments, the monitoring server may be configured to automatically match a plurality of exception cases to completely reconcile one or more of the exception cases. The monitoring server may establish a data link stored between the plurality of exception cases by updating the corresponding exception case data records to include data reflective of the linked exception case data records. These data links may be added automatically, and the underlying exception case data records may be embodied as immutable data objects, such that the automatically added records cannot be modified or deleted after adding. Accordingly, regardless of whether data is added to the exception case data objects automatically or based at least in part on manual user input, the resulting exception case data objects reflect an immutable record of reconciliation of the exception case.

With reference again to FIG. 5, the monitoring server monitors for data received from each of the plurality of identified relevant data sources, as indicated at Block 507. While monitoring inputs received from each of the plurality of relevant data sources, the monitoring server may be configured to ensure that receipt of data (e.g., an identified type of data) is received by a defined deadline. Upon determining that data from a relevant data source is not received by an appropriate deadline, the monitoring server may be configured to update a graphical user interface to reflect that the data is overdue (e.g., by updating an appropriate symbol 604-607 to a red color).

As indicated above, the monitoring server may be configured to selectively end the reconciliation process upon receipt of data deemed sufficient to fully reconcile a particular exception case. As indicted in Block 508, upon receipt of data indicated as sufficient to reconcile a particular exception case, the monitoring server may generate and transmit a request for approval of closure of the case as being reconciled to one or more user computing entities 30 (e.g., via the interactive graphical user interface discussed herein). As noted above, the exception case data object may be an immutable record of steps/data relating to reconciling a particular exception case, and accordingly, regardless of whether the exception case is reconciled, all data added to the exception case data object may be maintained. If additional/different data is necessary to reconcile the exception case, the prior data remains within the exception case data object to provide a complete record of steps taken to reconcile the exception case.

In certain embodiments, approval to consider a case reconciled may be required from one or more users/entities, such as an investigator, the investigator's supervisor, a financial institution, and/or the like. Accordingly, the monitoring server may be configured to maintain an open status of an exception case data object until receipt of approval from the one or more entities indicated as required for reconciling the exception case.

As indicated at Block 509, upon receipt of approval at least partially reconciling the exception case, the monitoring server updates the status of the exception case to a "closed" or "partially closed" status (e.g., by updating a status indicator that may be stored within the exception case data object; by adding a new time-stamped status indicator for storage within the exception case data object, and/or the like).

With reference to the remaining FIGS. 7-11, the monitoring server is further configured to provide additional data regarding an exception case data object via the interactive graphical user interface, for example, in response to receipt of user input requesting additional data.

FIG. 7 specifically provides an example exception case detail page providing additional detail regarding an exception case. An exception case detail page such as those shown in FIG. 7 may be accessible by selecting an interactive data element corresponding with data displayed relative to a particular exception case within a summary graphical user interface such as that displayed in FIG. 6. The case detail page comprises a plurality of detail elements regarding the exception, such as the customer identifier associated with the exception, the location name associated with the exception, the location identifier associated with the exception, various third parties associated with the exception (e.g., a carrier name/identifier; a financial institution name/identifier, an exception amount, an exception date, and/or the like. Moreover, the exception case detail page may be provided as a plurality of tabs that may be selectively accessed to obtain additional data. These tabs may be provided in two, simultaneously accessible panes within the graphical user interface, such that selection of a tab in a first pane causes the display within the first pane to change while the data within the second pane remains unchanged. In the illustrated embodiment of FIG. 7, the first pane may comprise a plurality of tabs such as a bibliographic information tab (labeled with the unique case identifier), a status information tab, a notes tab, a files tab, a case history tab, and/or the like. The second pane may comprise a second plurality of tabs, such as a machines tab, a match tab, a transmitted data tab, a net case sales tab, and/or the like.

As shown in the display of FIG. 7, the contents of the match tab in the second pane may be generated based at least in part on an exception type corresponding with the exception case data object for which the detailed display is provided. In the illustrated example of FIG. 7, the detailed data relates to a missing drecord exception, and accordingly the match tab provides a plurality of selectable drecords that have not been reconciled and thus are available for selection to at least partially reconcile the missing drecord exception. It should be understood that other exceptions may correlate to different data displayed within the match tab, which may be populated automatically by the monitoring server based at least in part on the type of exception for which the detail data is displayed. In certain embodiments, the monitoring server may be configured to automatically select and/or to flag at least one of the displayed records within the match tab as a suggested record for reconciling the exception case. In such embodiments, the graphical user interface may comprise an indication (e.g., a symbol, a color-based indication, and/or the like) regarding the recommended matching records for reconciling the exception case.

Figures 8, 9:
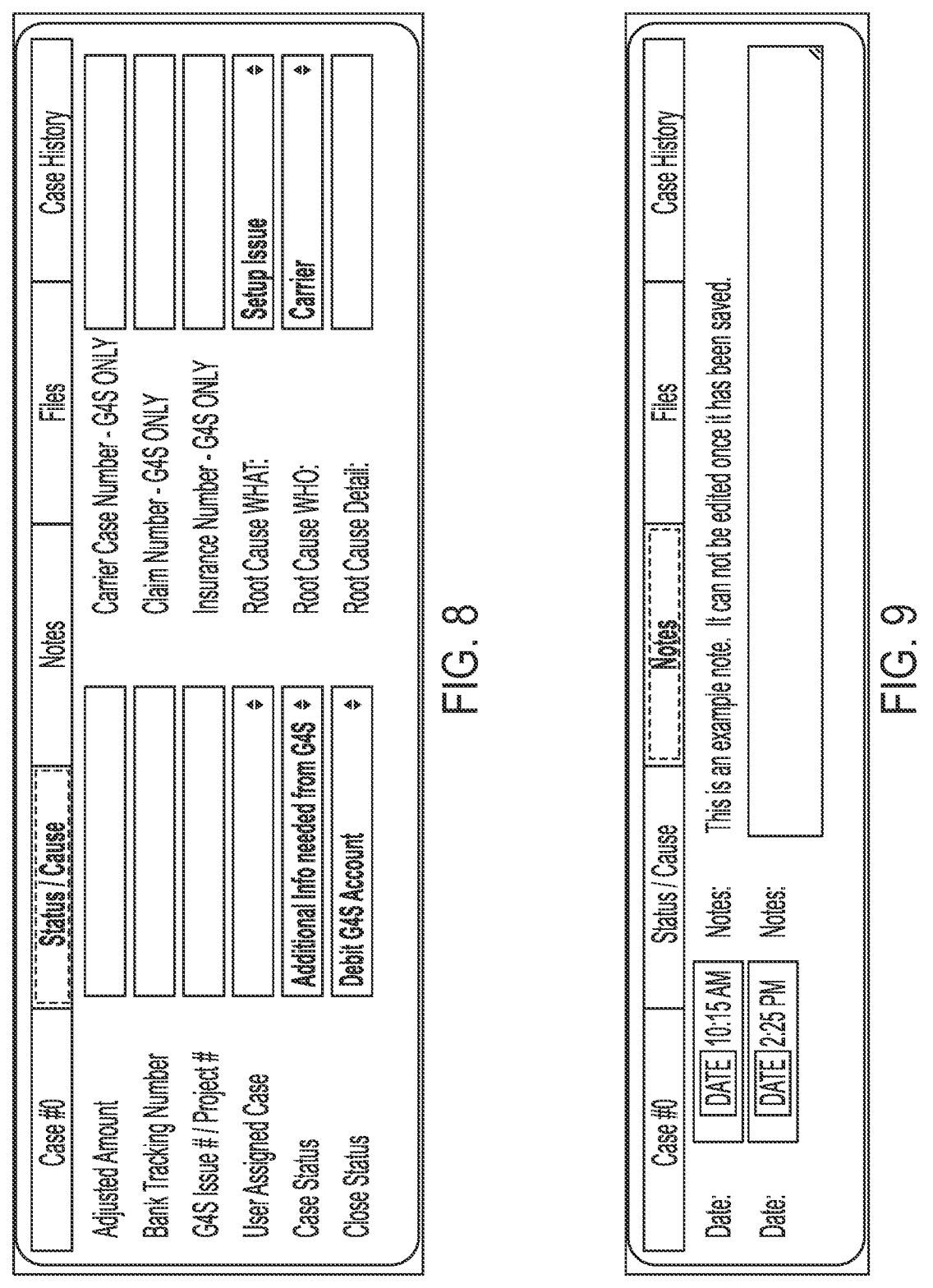

FIG. 8 illustrates example contents of a status tab within the first pane according to certain embodiments. As shown therein, the status tab may comprise data indicative of an adjusted amount of cash subject to the exception case (e.g., after applying a partial reconciling amount), financial-institution specified data, such as a financial-institution tracking number, a monitoring server tracking number, a user assigned to the exception case, a current status of the exception case (which may correspond to the status identifying symbols 604-607 shown in FIG. 6). Additional identifying data may also be provided in the status tab, such as data indicative of tracking numbers corresponding with a carrier, a claim number, an insurance number, and/or the like. Moreover, the status tab may comprise data indicative of a root cause (if/when known) of the exception. As illustrated in FIG. 8, the data within the status tab may be updatable based at least in part on user input (e.g., via freeform text input, by selecting from a plurality of available inputs within a dropdown, and/or the like). In certain embodiments, the monitoring server may be configured to automatically populate one or more fields within the status tab, such as upon receipt and/or otherwise upon identifying relevant contents for inclusion therein. Although the exception case data object may be immutable, as discussed herein, the status information tab may be populated with only the most-updated data (to avoid user confusion), while data previously populated within the status tab may be stored for audit purposes separately within the exception case data object.

FIG. 9 illustrates example contents of the notes tab within the first pane according to certain embodiments. As shown in FIG. 9, each note may be embodied as user-entered freeform text that may be stored together with metadata indicative of dates/times at which the note was entered. Due to the immutable nature of the exception case data objects, once a note has been entered, it cannot be later changed by a user, and the note is displayed together with the date/time stamp corresponding to entry of the note within the exception case data object.

FIG. 10 illustrates the contents of the files tab according to certain embodiments. The files tab comprises a file upload portion configured to enable users to upload files (e.g., supporting documentation associated with reconciliation with an exception case). The uploaded documentation is added to the exception case data object. Because the exception case data object is immutable, the files may not be deleted after upload, however the files may be downloaded as indicated in the example of FIG. 10.

FIG. 11 illustrates the contents of the case history tab according to certain embodiments. As shown therein, the case history data tab may comprise a listing of all changes performed relating to the exception case data object. As noted previously, historical changes to the status of an exception case may not be reflected within the status tab, however such historical changes may be reflected within data stored for the exception case data object, and may be reflected within the case history data tab (e.g., each change being accompanied by data indicative of a date and time-stamp indicating the date/time at which the change occurred).

As noted above, the second pane may comprise tabs such as a machines tab, a match tab, a transmitted data tab, a net case sales tab, and/or the like. The machines tab may comprise tabular data regarding the contents of a relevant cash handling device, contents of a relevant point-of-sale terminal, and/or other machines deemed relevant to a particular exception case. The machines tab may comprise data indicative of transactions occurring involving the relevant machine, which may be utilized to determine whether any transactions recorded with respect to a particular machine are indicative of information deemed relevant to reconciling a particular exception case.

The transmitted data tab of the second pane may provide a listing of data transmitted to a financial institution as a part of a process for reconciling an exception case. Such information may be provided as an immutable record of data transfers between the monitoring server and a financial institution during an investigative process relating to reconciling an exception case.

The net cash sales tab may provide data indicative of verified transactions occurring with respect to a particular cash handling device, point-of-sale terminal, and/or other device involving a change in fund amounts within possession of a customer.

As discussed above, the monitoring server may be configured to request user input after identifying data to reconcile an exception case prior to closing the exception case. Such user input may be provided by confirming closure of the exception case via a user interface element provided as a part of an exception case detail.

Moreover, in certain embodiments, the monitoring server is configured to generate notifications to be provided to various users, such as via email, via a notification system executed by the monitoring server, and/or the like. Such notifications may be generated to include contents indicative of changes made to exception case data objects relating to the user, contents indicative of newly assigned exception case data objects relating to the user, and/or the like.

Conclusion

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An automated cash transaction reconciliation system for generating an immutable record of a transaction reconciliation, the system comprising:
   one or more memory storage areas; and
   one or more processors collectively configured to:
   receive transaction data corresponding with a plurality of cash-based transactions, wherein the transaction data is generated via a cash handling device to reflect physical cash movement associated with the cash handling device;
   generate and store, for one or more of the plurality of cash-based transactions, an exception case data object for storage as an immutable data object within the one or more memory storage areas;
   automatically determine, for each exception case data object, a plurality of associated data sources based at least in part on metadata stored in association with each exception case data object;
   receive update data for a corresponding exception case data object of the plurality of exception case data objects;
   match a source of the update data with one of the plurality of associated data sources;
   upon matching the source of the update data with the one of the plurality of associated data sources, immutably store the update data as an immutable update to the corresponding exception case data object together with a timestamp associated with the update data wherein the immutable update is stored within the one or more memory storage areas and associated with the exception case data object; and
   generate a graphical user interface displaying data relating to the corresponding exception case data object, wherein the graphical user interface comprises a plurality of updatable fields each configured for display of data stored within the corresponding exception case data object having a most-recent timestamp;
   upon immutably storing the update data, identify a portion of the update data associated with a first updateable field of the plurality of updateable fields, wherein the portion of the update data is identified as having the most-recent timestamp of immutably stored data within the exception case data object for display within the first updatable field;
   automatically update data for display within the first updatable field based at least in part on timestamps of the immutably stored data to display at least a portion of the update data; and
   upon receipt of user input provided via the graphical user interface, display a historical data record relating to the corresponding exception case data object, wherein the historical data record comprises historical data previously included within at least one of the plurality of updatable fields.

2. The automated cash transaction reconciliation system of claim 1, wherein the one or more processors are further configured to:
   identify received update data as reconciling the corresponding exception case data object;
   transmit an approval request data object to at least one of the plurality of associated data sources; and
   upon receipt of approval data in response to the approval request data object, close the corresponding exception case data object.

3. The automated cash transaction reconciliation system of claim 1, wherein the one or more processors are further configured to automatically assign a user identifier to an exception case data object, wherein the assigned user identifier is identified as one of the plurality of associated data sources.

4. The automated cash transaction reconciliation system of claim 3, wherein generating a graphical user interface comprises generating a graphical user interface accessible via a user computing entity associated with the assigned user identifier.

5. The automated cash transaction reconciliation system of claim 3, wherein the one or more processors are further configured to generate a summary graphical user interface reflecting a plurality of exception case data objects associated with the user identifier.

6. The automated cash transaction reconciliation system of claim 1, wherein each of the exception case data objects are configured for storing one or more data files in association with each of the exception case data objects.

7. The automated cash transaction reconciliation system of claim 1, wherein the one or more processors are further configured to automatically identify a link between at least two of the plurality of exception case data objects to at least partially reconcile the at least two of the plurality of exception case data objects, and wherein data indicative of the link is stored within each of the at least two of the plurality of exception case data objects.

8. A computer-implemented method for automated cash transaction reconciliation for generating an immutable record of a transaction reconciliation, the method comprising:
   receiving, via one or more processors, transaction data corresponding with a plurality of cash-based transactions, wherein the transaction data is generated via a cash handling device to reflect physical cash movement associated with the cash handling device;
   generating and storing, via the one or more processors and for one or more of the plurality of cash-based transactions, an exception case data object for storage as an immutable data object within the one or more memory storage areas;
   automatically determining, via the one or more processors and for each exception case data object, a plurality of associated data sources based at least in part on metadata stored in association with each exception case data object;
   receiving, via the one or more processors, update data for a corresponding exception case data object of the plurality of exception case data objects;

matching, via the one or more processors, a source of the update data with one of the plurality of associated data sources;

upon matching the source of the update data with the one of the plurality of associated data sources, immutably storing, within one or more memory storage areas, the update data as an immutable update to the corresponding exception case data object together with a timestamp associated with the update data wherein the immutable update is stored within the one or more memory storage areas and associated with the exception case data object; and generating, via the one or more processors, a graphical user interface displaying data relating to the corresponding exception case data object, wherein the graphical user interface comprises a plurality of updatable fields each configured for display of data stored within the corresponding exception case data object having a most-recent timestamp;

upon immutably storing the update data, identifying, via the one or more processors, a portion of the update data associated with a first updateable field of the plurality of updateable fields, wherein the portion of the update data is identified as having the most-recent timestamp of immutably stored data within the exception case data object for display within the first updatable field;

automatically updating, via the one or more processors, data for display within the first updatable field based at least in part on timestamps of the immutably stored data to display at least a portion of the update data; and upon receipt of user input provided via the graphical user interface, displaying, via the one or more processors, a historical data record relating to the corresponding exception case data object, wherein the historical data record comprises historical data previously included within at least one of the plurality of updatable fields.

9. The computer-implemented method for automated cash transaction reconciliation of claim 8, further comprising:

identifying received update data as reconciling the corresponding exception case data object;

transmitting an approval request data object to at least one of the plurality of associated data sources; and upon receipt of approval data in response to the approval request data object, closing the corresponding exception case data object.

10. The computer-implemented method for automated cash transaction reconciliation of claim 8, further comprising automatically assigning a user identifier to an exception case data object, wherein the assigned user identifier is identified as one of the plurality of associated data sources.

11. The computer-implemented method for automated cash transaction reconciliation of claim 10, wherein generating a graphical user interface comprises generating a graphical user interface accessible via a user computing entity associated with the assigned user identifier.

12. The computer-implemented method for automated cash transaction reconciliation of claim 10, further comprising generating a summary graphical user interface reflecting a plurality of exception case data objects associated with the user identifier.

13. The computer-implemented method for automated cash transaction reconciliation of claim 8, wherein each of the exception case data objects are configured for storing one or more data files in association with each of the exception case data objects.

14. The computer-implemented method for automated cash transaction reconciliation of claim 8, further comprising automatically identifying a link between at least two of the plurality of exception case data objects to at least partially reconcile the at least two of the plurality of exception case data objects, and wherein data indicative of the link is stored within each of the at least two of the plurality of exception case data objects.

15. A computer program product comprising a non-transitory computer readable medium having computer program instructions stored therein, the computer program instructions when executed by a processor, cause the processor to:

receive transaction data corresponding with a plurality of cash-based transactions, wherein the transaction data is generated via a cash handling device to reflect physical cash movement associated with the cash handling device;

generate and store, for one or more of the plurality of cash-based transactions, an exception case data object for storage as an immutable data object within the one or more memory storage areas;

automatically determine, for each exception case data object, a plurality of associated data sources based at least in part on metadata stored in association with each exception case data object;

receive update data for a corresponding exception case data object of the plurality of exception case data objects;

match a source of the update data with one of the plurality of associated data sources;

upon matching the source of the update data with the one of the plurality of associated data sources, immutably store, within one or more memory storage areas, the update data as an immutable update to the corresponding exception case data object together with a timestamp associated with the update data wherein the immutable update is stored within the one or more memory storage areas and associated with the exception case data object; and generate a graphical user interface displaying data relating to the corresponding exception case data object, wherein the graphical user interface comprises a plurality of updatable fields each configured for display of data stored within the corresponding exception case data object having a most-recent timestamp;

upon immutably storing the update data, identify a portion of the update data associated with a first updateable field of the plurality of updateable fields, wherein the portion of the update data is identified as having the most-recent timestamp of immutably stored data within the exception case data object for display within the first updatable field;

automatically update data for display within the first updatable field based at least in part on timestamps of the immutably stored data to display at least a portion of the update data; and upon receipt of user input provided via the graphical user interface, display a historical data record relating to the corresponding exception case data object, wherein the historical data record comprises historical data previously included within at least one of the plurality of updatable fields.

16. The computer program product of claim 15, wherein the computer program instructions are further configured to, when executed by a processor, cause the processor to:

identify received update data as reconciling the corresponding exception case data object;

transmit an approval request data object to at least one of the plurality of associated data sources; and upon receipt of approval data in response to the approval request data object, close the corresponding exception case data object.

17. The computer program product of claim 15, wherein the assigned user identifier is identified as one of the plurality of associated data sources.

18. The computer program product of claim 17, wherein generating a graphical user interface comprises generating a graphical user interface accessible via a user computing entity associated with the assigned user identifier.

19. The computer program product of claim 15, wherein the computer program instructions are further configured to, when executed by a processor, cause the processor to generate a summary graphical user interface reflecting a plurality of exception case data objects associated with the user identifier.

20. The computer program product of claim 15, wherein the computer program instructions are further configured to, when executed by a processor, cause the processor to automatically identify a link between at least two of the plurality of exception case data objects to at least partially reconcile the at least two of the plurality of exception case data objects, and wherein data indicative of the link is stored within each of the at least two of the plurality of exception case data objects.

* * * * *